Oct. 8, 1963  R. E. ANDERSON  3,106,643
RADIATION INVERSION DEVICE AND FLAW DETECTOR EMBODYING SAME
Filed June 30, 1961
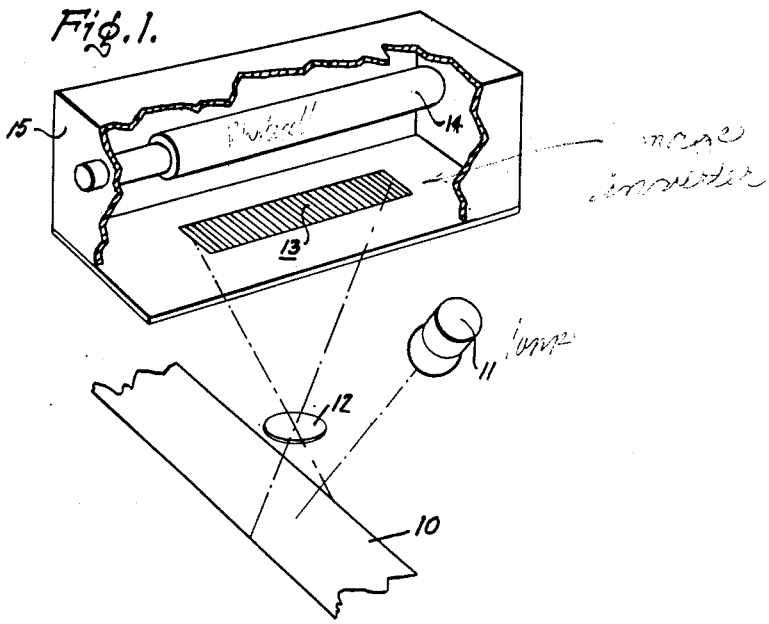
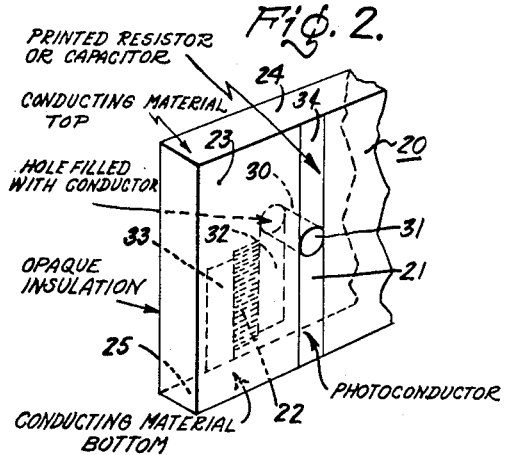
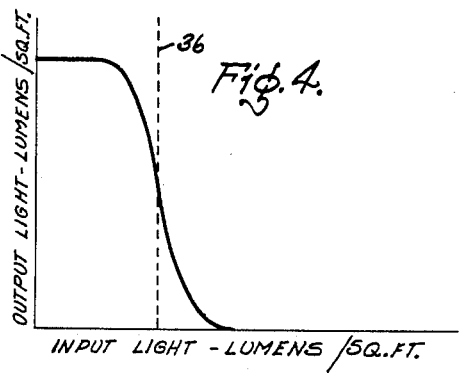
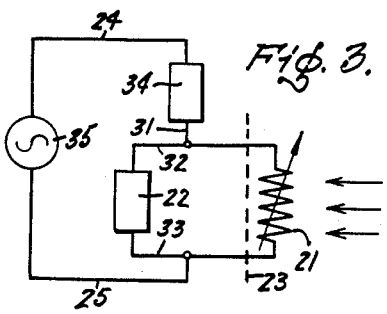
Inventor
Roy E. Anderson
by Paul A. Frank
His Attorney

United States Patent Office

3,106,643
Patented Oct. 8, 1963

3,106,643
RADIATION INVERSION DEVICE AND FLAW DETECTOR EMBODYING SAME
Roy E. Anderson, Schenectady, N.Y., assignor to General Electric Company, a corporation of New York
Filed June 30, 1961, Ser. No. 121,080
9 Claims. (Cl. 250—219)

This invention relates primarily to a radiation inverter and, more particularly, to a radiation inverter which is particularly suited to be incorporated into an inspection apparatus for detecting a small blemish, flaw or foreign particle on a sheet of moving material or for inverting a radiation image.

The importance of monitoring the quality of industrial products, such as moving strips or sheets of paper, sheet steel, etc., has increased steadily with the development of high speed techniques. When inspecting the surface of a moving strip of tin plate for flaws, the area under inspection is usually highly illuminated in order to accentuate the blemishes thereon. When such a surface is highly illuminated, it is still relatively difficult to detect a very small blemish since the blemish or flaw shows up as a small dark spot in a field of high light energy content. Light level indicators as a means of detecting flaws are usually undesirable because any defect in, or any change in the brightness of, the illuminating apparatus will result in faulty detection.

Accordingly, it is a principal object of the present invention to provide an improved radiation inverter whereby a small dark spot on a highly illuminated field may be converted to a highly illuminated spot in a dark field of view.

Another object of the invention is to provide an improved inspection apparatus for detecting flaws in a sheet of moving material.

Yet another important object of the present invention is to provide a radiation inverter which may be cheaply and easily constructed by printed board techniques.

A further object of the present invention is to provide inspection apparatus capable of detecting a small blemish or flaw in a large field of view without employing a point-to-point scan.

The fundamental concept of the present invention involves the inspecting of a large area of a sheet of moving material and producing an image thereof wherein a small blemish, defect or flaw appears as a highly illuminated spot in a dark field of view. As used in this specification, the terms "blemish," "defect" or "flaw" are used to indicate any surface condition that provides a reflection substantially lower than that provided by a normal or desired surface.

While the specification concludes with claims particularly pointing out and distinctly claiming the subject matter which is regarded as the invention, it is believed the invention will be better understood from the following description taken in connection with the accompanying drawings, in which:

FIGURE 1 is a view of an embodiment of the inspection system for detecting flaws in a sheet of moving material;

FIGURE 2 is a perspective view of a portion of one embodiment of the radiation inverter which may be used with the inspection system of FIGURE 1;

FIGURE 3 is a schematic diagram of the circuit representing the radiation inverter showing the manner in which a current source is applied to it; and FIGURE 4 is a curve which illustrates certain operational characteristics of my invention.

The operation of one embodiment of the invention may best be understood by reference to FIGURE 1 of the drawing wherein a sheet of moving material 10 is to be inspected for the presence of a flaw. In order to produce a radiation pattern indicative of the condition of the sheet of moving material 10, a radiation source, such as a lamp 11, is positioned to direct a beam of light on the sheet of moving material. The light reflected from the surface of the sheet of moving material is utilized by positioning a lens 12 to receive the light specularly reflected from the surface. In the embodiment illustrated by FIGURE 1, the lens 12 focuses the image which it receives on an image inversion system 13 comprising a linear array of radiation inverting devices which will be later described in detail in connection with FIGURE 2. The image inversion system performs the functions of interchanging the high and low reflecting portions of the image projected thereon in such a manner that a low reflecting portion of the incident image is produced on the back of the image inversion system 13 as a very bright spot in a dark field of view. Once the image is reversed in this manner, it is a simple matter to detect the presence of any bright spot by inspecting the back of the image inversion system with a conventional photoelectric cell 14 contained within enclosure 15. The output of the photoelectric cell 14 may be used to signal the presence of a flaw in the sheet of moving material 10.

A radiation inversion means 20 of the image inversion system 13 is shown in detail in FIGURE 2. A portion of the image inversion system of the invention is photoresistive in nature. The image of a flaw to be detected induces a change in the electrical conductivity of a photoconductor 21 to control the emission of visible radiation from a radiation emitting element 22, such as an electroluminescent layer, to invert the image as will be described in more detail in connection with FIGURE 3 of the drawing.

In accordance with the invention, a preferred arrangement of radiation inversion means is shown by FIGURE 2 of the drawing. It will be understood that a plurality of the inversion means of FIGURE 2 may be arranged in any suitable fashion to form radiation image inversion means. The radiation inversion means 20 can be made by a printed board technique in which a photoconductor 21, which may comprise any suitable material, such as, for example, cadmium sulfide, is applied to a portion of one side of an electrically insulated and light opaque supporting board or layer 23. Conductors 24 and 25 are applied to the top and bottom portions of the layer 23. A hole 30, which passes through board 23, is filled with a suitable conductive material 31, such as a layer or film of silver or copper, which is in electrical contact with photoconductor 21 on one side of board 23 and in contact with electroluminescent layer 22 applied to the opposite side of board 23. A suitable material for the electroluminescent material is, for example, zinc sulfide. A conductor 32 connects electroluminescent layer 22 to conductive material 31. A conductor 33 connects conductor 25 to the electroluminescent layer 22. The conductive material 31 is connected to the conductor 24 by means of a resistor or capacitor 34 which also may be applied to board 23 by well known printed circuit techniques.

FIGURE 3 shows the circuit representing the application of a current source 35 to the radiation inversion means 20. The electrical impedance of electroluminescent layer 22 and photoconductor 21 are of the same order of magnitude. In this circuit, the voltage of alternating current source 35 is divided across element 34 and the parallel combination of elements 21, 22. The impedance of layers 21 and 22 and the magnitude of the applied voltage are selected so that when photoconductor 21 is not subjected to radiation, the electric field across element 22 is just below the threshold of electroluminescence and, hence, the light is not emitted from the electroluminescent layer 22. When the photoconductor is subjected to a low incident radiation; i.e., radiation from those portions of the sheet of material 10 which show a flaw or blemish, its impedance is high and the voltage across parallel combination of electroluminescent layer 22 and layer 21 increases, thereby raising the electric field across layer 22 above the threshold of luminescence. Therefore, the electroluminescent layer 22 emits radiation. The bright spot due to this radiation may be easily detected by a light sensitive device, such as photoelectric cell 14, to signal an indication of a flaw in the sheet of moving material 10. When the radiation level incident upon the photoconductor is increased; i.e., when the radiation is reflected from a flawless surface, its impendance decreases. This condition decreases the current through the electroluminescent layer 22 which, in turn, reduces the electric field on the electroluminescent layer below the threshold of electroluminescence, thereby causing radiation to be reduced and the electroluminescent layer 22 to become dark.

In FIGURE 4, I have illustrated the non-linear characteristic desired in a radiation inversion means 20 in order to achieve a desired contrast sufficient to detect a small blemish in a large field of view. Below a threshold 36 of input light, the output light increases rapidly. A radiation inversion means 20, employing cadmium sulfide as a photoconductive material 21 and zinc sulfide as an electroluminescent material 22, was found to provide such nonlinear characteristic. Other suitable phosphors may be used and, depending upon the phosphors chosen, direct current voltages rather than the alternating voltage 35 may be impressed across the radiation inversion means.

The particular embodiment of the image inversion system 13 shown by FIGURE 1 utilizes a plurality of the radiation inversion means 20 arranged in a line or plane of finite width wherein those devices receiving reflected light from portions of the sheet of moving material 10 of finite width having flawless surfaces will be darkened, while those receiving reflected light from portions having a flaw or blemish will emit radiation; i.e., appear as bright spots. It should also be understood, however, that a plurality of light inverter devices 20 of the invention may be arranged in an area array of any desired pattern for providing light inverted images of any desired shaped area for any desired purpose whether or not limited to optical inspection apparatus. Further, the radiation emitting element may be made responsive to various types of radiation; e.g., infra-red radiation which would enable it to be utilized in an application such as a snooper-scope.

Although a particular embodiment of the subject invention has been described, many modifications may be made, and it is understood to be the intention of the appended claims to cover all such modifications that fall within the true spirit and scope of the invention.

What I claim as new and desire to secure by Letters Patent of the United States is:

1. An inspection apparatus for detecting flaws in a sheet of moving material including the combination of a radiation source directed toward the area to be inspected and inspection means positioned to receive radiation from the area inspected, said inspection means including an array of elements in a line to increase the contrast between observed defects and normal surface variations in the material and produce an inverted image of the area under inspection wherein the light and dark portions of the area are interchanged, said elements comprising a plurality of radiation responsive devices disposed on one side of a support member and a plurality of radiation emitting devices disposed on the opposite side thereof, and radiation sensitive means positioned to receive radiation from said inverted image to signal passage of a flaw in said sheet of moving material.

2. An inspection apparatus for detecting flaws in a sheet of moving material of finite width including the combination of a radiation source directed toward the sheet of moving material, a plurality of radiation sensitive devices each comprising a photoconductor connected in series with a source of current together with an electrically responsive radiation emitting element in parallel therewith, support means positioning each of said devices in an array of finite width with said photoconductors in optical alignment with and facing the reflected radiation from said moving material and radiation source, said photoconductors disposed on one side of said support means and said elements disposed on an opposite side thereof, and means responsive to radiation emitted by any of said elements to signal passage of a flaw in said sheet of moving material.

3. An inspection apparatus for detecting flaws in a sheet of moving material of finite width including the combination of a light source directed toward the sheet moving material, a plurality of light sensitive devices, each of said devices comprising a photoconductor connected in series with a source of current together with an electrically responsive light emitting element, a first means positioning each of said devices in an array of finite width with said photoconductors in optical alignment with and facing the reflected light from said moving material and light source, a second means extending through said first means to connect each said element in parallel with each said photoconductor, and means responsive to light emitted by any of said elements to signal passage of a flaw in said sheet of moving material.

4. An inspection apparatus for detecting flaws in a sheet of moving material of finite width including the combination of a light source directed toward the sheet of moving material, a plurality of light sensitive devices, each of said devices comprising a photoconductor connected in series with a source of alternating current together with an electrically responsive light emitting element, a first means positioning each of said devices in an array of finite width with said photoconductors in optical alignment with and facing the reflected light from said moving material and light source, a second means extending through said first means to connect each said element in parallel with each said photoconductor, and means responsive to light emitted by any of said elements to signal passage of a flaw in said sheet of moving material.

5. An inspection apparatus for detecting flaws in a sheet of moving material of finite width including the combination of a light source directed toward the sheet of moving material, a plurality of light sensitive devices, each of said devices comprising a photoconductor connected in series with a source of alternating current together with an electroluminescent element in parallel therewith, means positioning each of said devices in an array of finite width with said photoconductors in optical alignment with and facing the reflected light from said moving material and light source, said photoconductors disposed on a first side of said means, said elements disposed on a second side of said means, said source of current connected to a third and fourth side of said means, and means responsive to light emitted by any of said elements to signal passage of a flaw in said sheet of moving material.

6. An inspection apparatus for detecting flaws in a sheet of moving material of finite width including the combination of a light source directed toward the sheet of moving material, a plurality of light sensitive devices, each of said devices comprising a photoconductor connected in series with a source of current and a load together with an electroluminescent element in parallel with said photoconductor, means positioning each of said devices in an array of finite width with said photoconductors in optical alignment with and facing the reflected light from said moving material and light source, said photoconductors disposed on a first side of said means, said elements disposed on a second side of said means, said source of current connected to a third and fourth side of said means, and means responsive to light emitted by any of said elements to signal passage of a flaw in said sheet of moving material.

7. A radiation inversion means comprising a support of electrically insulated and optically opaque material, a radiation responsive device having an electrical resistance which varies with radiation intensity fixed to one side of said support, an electrically responsive radiation emitting element whose radiation emission varies with applied electrical potential fixed to the other side of said support, means to connect a source of current to said device, and means extending through said support to connect said element in parallel with said device, the resistance of said device being such that increases of light intensity falling on said device modify the electrical potential across said element in a manner to decrease radiation emission by said element and vice versa.

8. A radiation inversion means comprising in combination an electrically insulated and light opaque layer, first and second conductors applied to the top and bottom edge of said layer, a photoconductor applied to one side of said layer and connected to said first and second conductors, a third conductor connected to said photoconductor and passing through said layer to the opposite side, an electrically responsive radiation emitting material applied to said opposite side, a fourth conductor applied to said opposite side connecting said material to said second conductor, and a fifth conductor applied to said opposite side connecting said material to said third conductor passing through said layer.

9. A radiation inversion means comprising in combination an electrically insulated and light opaque layer, first and second conductors applied to the top and bottom edges of said layer, a photoconductor applied to one side of said layer and connected to said first and second conductors, a third conductor connected to said photoconductor and passing through said layer to the opposite side, a load connected between said first and third conductors, an electroluminescent material applied to said opposite side, a fourth conductor applied to said opposite side connecting said material to said second conductor, and a fifth conductor applied to said opposite side connecting said material to said third conductor passing through said layer.

References Cited in the file of this patent

UNITED STATES PATENTS

| | | |
|---|---|---|
| 2,883,556 | Jenny et al. | Apr. 21, 1959 |
| 2,890,350 | Lempicki | June 9, 1959 |
| 2,891,169 | Nicoll | June 16, 1959 |
| 2,950,799 | Timms | Aug. 30, 1960 |